June 28, 1927.

G. C. LONG

COUPLING

Filed Feb. 27, 1926

1,634,153

WITNESSES

INVENTOR
George C. Long.
BY
ATTORNEYS

Patented June 28, 1927.

1,634,153

UNITED STATES PATENT OFFICE.

GEORGE C. LONG, OF BROOKLYN, NEW YORK.

COUPLING.

Application filed February 27, 1926. Serial No. 91,186.

This invention relates to couplings and method of securing the same in a hose.

An object of the invention is to provide a coupling which when secured in the hose by my improved method will be securely coupled or anchored therein and which cannot be accidentally drawn out, blown out, or otherwise disconnected from the hose.

It is a well known fact that hose couplings as ordinarily made can and do frequently come out of the hose, resulting in loss of time and in many cases loss of life and injury to workmen.

My invention particularly relates to a coupling designed for use in hose although it is applicable to many other uses such as gas hose, steam hose and the like, and I do not limit myself to any particular use but desire to cover my improved coupling and the method of installing the same for any use to which the coupling may be put.

With these and other objects in view, the invention consists in certain novel features of construction and certain novel steps in the method, all of which will be more fully hereinafter described and pointed out in the claim.

In the accompanying drawings—

Figure 1:
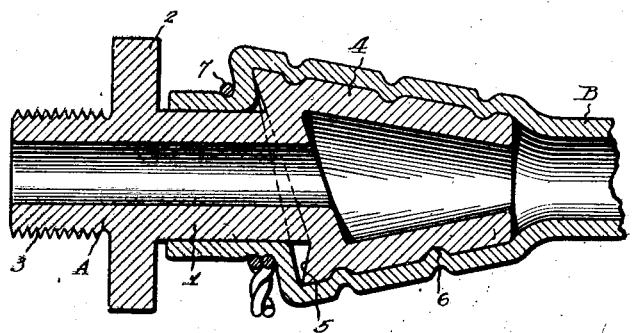
Figure 1 is a view in longitudinal section, showing my improved coupling in operative position in a hose.
Figure 2:
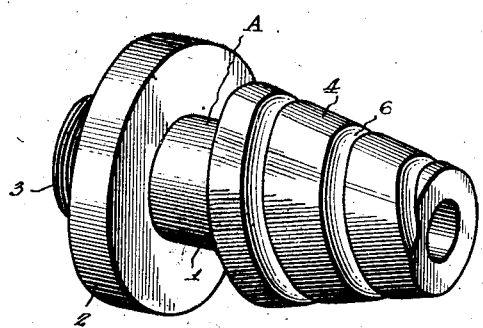
Figure 2 is a perspective view of the coupling removed.

A represents my improved coupling and B a hose to which it is coupled. The hose B may be of any standard form and reinforced in any approved manner but preferably composed largely of rubber, as is customary.

My improved coupling A is of general tubular form and cylindrical throughout a portion of its length, as shown at 1, and preferably provided on the cylindrical portion with an integral annular flange 2. One end of this cylindrical portion 1 may be screw-threaded, as shown at 3, for coupling to some other device, or this end of the coupling may be made in any desired manner for coupling engagement with another coupling or with any part to which attachment should be made.

On the inner end of the coupling A I provide an anchoring enlargement 4 which at its larger end at least is of appreciably greater diameter than the diameter of the cylindrical portion 1. This anchoring enlargement 4 is hollow and of general truncated conical form, the small end being at the extremity of the enlargement.

The larger end of this enlargement 4 has its end wall tapering inwardly, as shown at 5, and it will also be noted that this larger end of the enlargement has its end wall located at an angle other than a right angle to the longitudinal axis of the coupling.

The enlargement 4 is made externally screw-threaded, as indicated at 6, and while I have illustrated the screw thread as being formed by a groove in the surface of the enlargement I would have it distinctly understood that this enlargement may be rendered screw-threaded in any approved manner, and I do not wish to be limited to the idea of a groove.

7 represents a wire which is positioned around the end of the hose which encircles the cylindrical portion 1 of the coupling, and the ends of this wire are twisted together so as to bind the hose and securely anchor the enlargement 4 in the hose.

My improved method of installing the coupling is as follows:

I first heat the coupling, or at least the enlargement 4 of the coupling, sufficiently to partially melt or sear the inner surface of the hose B, and while the coupling is thus hot it is forced into the hose by imparting to the coupling a turning movement so that the screw-threaded exterior of the enlargement 4 will grip the inner face of the hose and pull the enlargement 4 therein. When the coupling is in the hose, the hose with the coupling therein is immersed in water to quickly cool the coupling and the hose so that the rubber surface will be practically vulcanized to the enlargement 4 and any attempt to remove the same is rendered extremely difficult and accidental removal is practically impossible. Certainly this is true after the wire 7 is secured around the hose as indicated.

I would call particular attention to the shape of the larger end of the enlargement 4. It will be noted that this end as above stated has its wall inwardly tapered and is at an angle other than a right angle to the longitudinal axis of the coupling. This shape not only facilitates the forcing of the enlargement into the hose, as the shape of the wall forms in effect a continuation of the screw thread, but when it is in the hose it provides a wall or shoulder which is of such shape as to tend to bite into the hose rather than to draw out of the hose. Hence, with a device of this kind the danger of removal of the coupling is overcome.

Various slight changes and alterations might be made in the general form of the parts described without departing from the invention, and hence I do not limit myself to the precise details set forth but consider myself at liberty to make such slight changes and alteration as fairly fall within the spirit and scope of the appended claim.

I claim:

A coupling of the character described, having at one end a truncated conical enlargement, the smaller end of the enlargement being at the extremity of the coupling, and the larger end of the enlargement having its end wall at an angle other than a right angle to the longitudinal axis of the coupling, said wall also recessed conically inwardly from its outer to its inner edge.

GEORGE C. LONG.